United States Patent
Mayr

(10) Patent No.: US 9,606,546 B2
(45) Date of Patent: Mar. 28, 2017

(54) MOTOR VEHICLE HAVING A TAILGATE ARRANGEMENT CONSISTING OF A PIVOTABLE LOWER TAILGATE AND A PIVOTABLE UPPER TAILGATE

(71) Applicant: Bayerische Motoren Werke Aktiengesellschaft, Munich (DE)

(72) Inventor: Juergen Mayr, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/831,968

(22) Filed: Aug. 21, 2015

(65) Prior Publication Data

US 2016/0054738 A1   Feb. 25, 2016

(30) Foreign Application Priority Data

Aug. 22, 2014   (DE) .......................... 10 2014 216 760

(51) Int. Cl.
*G05D 3/00*    (2006.01)
*B60J 5/10*    (2006.01)
(Continued)

(52) U.S. Cl.
CPC .............. *G05D 3/00* (2013.01); *B60J 5/103* (2013.01); *B60J 5/105* (2013.01); *E05F 15/00* (2013.01);
(Continued)

(58) Field of Classification Search
CPC ................................. G05D 3/00; B60J 5/105
(Continued)

(56) References Cited

U.S. PATENT DOCUMENTS

2014/0025262 A1   1/2014   Eggeling et al.
2015/0224859 A1*  8/2015   Warburton ............... B60J 5/103
                                                       701/49

FOREIGN PATENT DOCUMENTS

DE    103 21 275 A1   12/2004
DE    600 32 833 T2   10/2007
(Continued)

OTHER PUBLICATIONS

German Search Report dated Sep. 15, 2014 with partial English-language translation (twelve (12) pages).

*Primary Examiner* — Anne M Antonucci
(74) *Attorney, Agent, or Firm* — Crowell & Moring LLP

(57) ABSTRACT

A motor vehicle has a tailgate arrangement consisting of a pivotable lower tailgate and a pivotable upper tailgate, the upper tailgate reaching partially over the lower tailgate in an overlapping region. A sensor system detects the respectively current position of both tailgates in the tailgate arrangement. The sensor system is connected to an electronic control unit for motorized actuation of both tailgates. The control unit has a functional module and in the process prevents a collision of the two tailgates in the overlapping region with consideration of their respectively current positions. The functional module is programmed such that, during closing of both tailgates starting from their respective start positions, their respective moving speed and/or their respective moving start are controlled in such a way that the upper tailgate passes a defined anti-collision position in the closing direction only when the lower tailgate is completely closed. The functional module may be programmed such that, during opening of both tailgates, the lower tailgate is not moved in the opening direction until the upper tailgate has passed the defined anti-collision position in the opening direction. The anti-collision position is a defined point, from which the (Continued)

possibility of geometric superimposition of the pivoting regions just cannot yet exist.

19 Claims, 1 Drawing Sheet

(51) Int. Cl.
 E05F 15/00 (2015.01)
 E05F 15/611 (2015.01)
(52) U.S. Cl.
 CPC ......... *E05F 15/611* (2015.01); *E05Y 2400/53* (2013.01); *E05Y 2900/544* (2013.01); *E05Y 2900/546* (2013.01)
(58) Field of Classification Search
 USPC .......................................................... 701/49
 See application file for complete search history.

(56) References Cited

FOREIGN PATENT DOCUMENTS

DE 10 2010 034 203 B3 11/2011
GB WO 2014037502 A1 * 3/2014 .............. B60J 5/103

\* cited by examiner

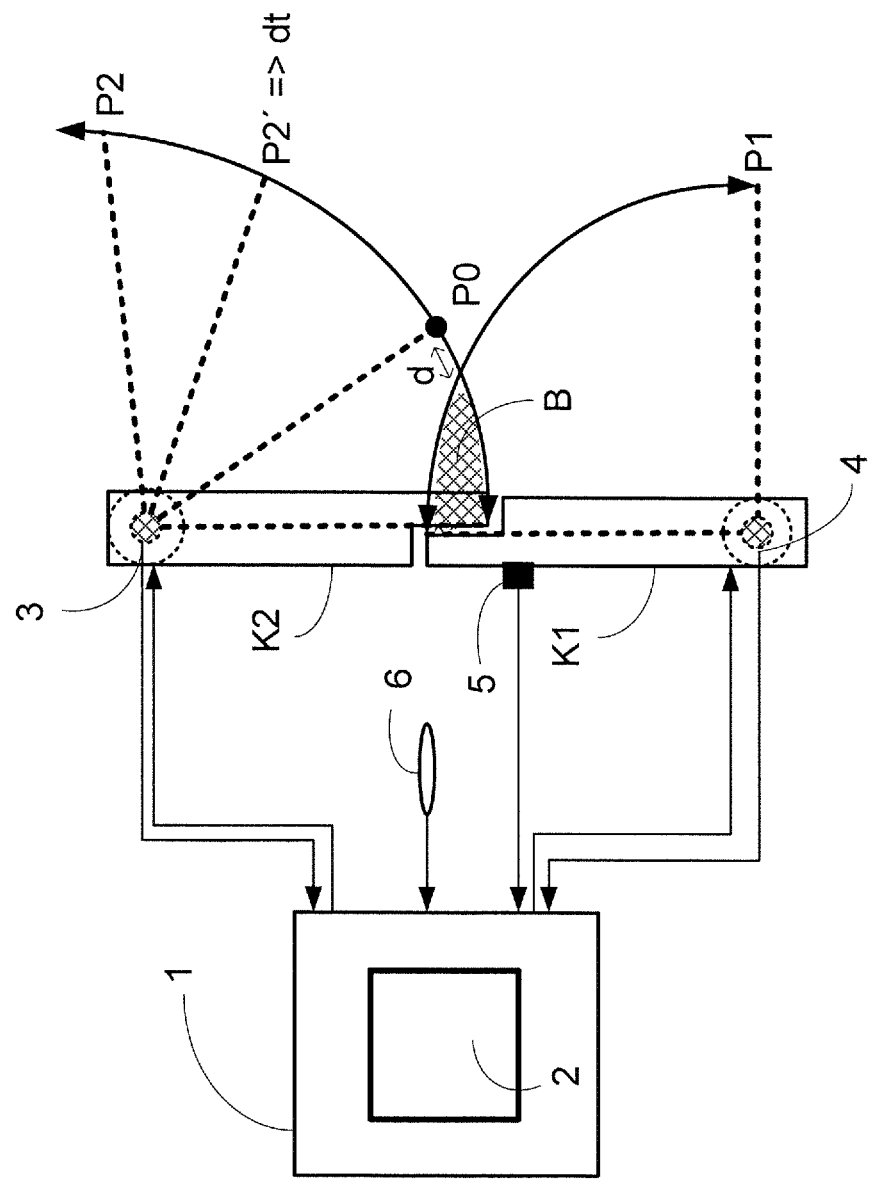

MOTOR VEHICLE HAVING A TAILGATE ARRANGEMENT CONSISTING OF A PIVOTABLE LOWER TAILGATE AND A PIVOTABLE UPPER TAILGATE

CROSS REFERENCE TO RELATED APPLICATION

This application claims priority under 35 U.S.C. §119 from German Patent Application No. 10 2014 216 760.4, filed Aug. 22, 2014, the entire disclosure of which is herein expressly incorporated by reference.

BACKGROUND AND SUMMARY OF THE INVENTION

The invention relates to a motor vehicle having a tailgate arrangement consisting of a pivotable lower tailgate and a pivotable upper tailgate, as is known, for example, from DE 10 2010 034 203 B3.

Here, in the case of a risk of collision, for example if only the lower tailgate is to be opened, but the upper tailgate is to be closed, the upper tailgate is first of all opened and, after opening of the lower tailgate, is closed again. This use case can unpleasantly surprise an operator who does not currently desire and expect opening of the upper tailgate.

In the present application, a "lower tailgate" is understood to mean in the broadest sense a tailgate which is covered partially in the closed state by an "upper tailgate". It is irrelevant here how the pivot axes are arranged (horizontal or vertical).

It is an object of the invention to provide a user-friendly control apparatus which prevents collisions for the above-mentioned tailgate arrangement.

According to the invention, this and other objects are achieved by a motor vehicle according to the invention having a tailgate arrangement comprising a pivotable lower tailgate and a pivotable upper tailgate, the upper tailgate reaching partially over the lower tailgate in an overlapping region. Furthermore, there is a sensor system for detecting the respectively current position of both tailgates in the tailgate arrangement. The sensor system is connected to an electronic control unit for motorized actuation of both tailgates. To this end, the control unit has a functional module and, in the process, prevents a collision of the two tailgates with one another in the overlapping region with consideration of their respectively current positions.

The functional module is configured, in particular by way of corresponding programming, in such a way that, during closing of both tailgates starting from their respective start positions, their respective moving speed and/or their respective moving start are controlled in such a way that the upper tailgate passes a defined anti-collision position in the closing direction only when the lower tailgate is completely closed. In addition or as an alternative, the functional module is configured in such a way that, during opening of both tailgates, the lower tailgate is not moved in the opening direction until the upper tailgate has passed a, or the, defined anti-collision position in the opening direction. The anti-collision position is a defined point, from which the possibility of geometric superimposition of the pivoting regions (overlapping region) just cannot yet exist.

In this basic concept, both a risk of collision and an intermediate stop or even a reversing operation after a moving start are to be prevented, in particular, in a simple way. Should the lower tailgate not yet have reached its closed position during the closing operation as the result of an error when the upper tailgate has already reached the anti-collision position, the automatic movement of the tailgates is stopped in the form of a failsafe latch.

The completely closed state of at least the lower tailgate is preferably ensured via a lock switch. As a result, the functional module experiences a simple plausibility check, without it being necessary to carry out precise position monitoring. Via this, the functional module also receives redundant information which can be utilized, for example, if the position data of the lower tailgate is lost. By way of an interrogation of the locked state of the lower tailgate, damage or a malfunction and, therefore, a necessary reversing operation of the upper tailgate during closing can be prevented.

In an advantageous embodiment, the anti-collision position is defined with a predetermined safety spacing from the overlapping region, which safety spacing is greater than zero. Permanent highly accurate position monitoring can also be dispensed with as a result.

In principle, both tailgates are moved after a moving start; this is because, in principle, stopping during a closing or opening operation should be avoided as far as possible from a user-friendly aspect. According to experience, stopping of automatically movable components usually leads to uncertainties for an operator.

In one advantageous refinement, depending on its current position, for example if the upper tailgate is not open to its maximum possible extent as a result of manual moving or as a result of corresponding opening restriction, the upper tailgate can begin to close at the start of the closing operation with a delay time with respect to the moving start of the lower tailgate or can close with a lower moving speed than in the case of a current start position with a greater or maximum possible degree of opening. As an alternative or in addition, the lower tailgate can begin to open with a delay time with respect to the upper tailgate at the start of an opening operation. Here, during opening of the tailgates, time-shifted energizing of the locks in order to achieve a delay time can be performed by way of the functional module, first of all the lock of the upper tailgate and then the lock of the lower tailgate being opened. As a result, simple control with movement of both tailgates at an approximately identical moving speed can be performed.

In addition or as an alternative, during a closing operation, the moving speed of the lower tailgate can, in principle, be predetermined to be greater than the moving speed of the upper tailgate, or, during an opening operation, the moving speed of the upper tailgate can in principle be predetermined to be greater than the moving speed of the lower tailgate. In particular, if the moving start of both tailgates is identical, simultaneous moving without a delay time is then possible.

In one preferred further refinement of the invention, but also as an independent concept, every automatic movement of the tailgates can be suppressed if the upper tailgate has been moved manually between the completely closed position and the (a) defined anti-collision position.

In principle, in this application, the closing time is also to be included in the expression moving speed in an equivalent manner.

The invention achieves a simplified, user-friendly and robust concept with reduced sensor system outlay for the special two-part tailgate arrangement.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE schematically illustrates one exemplary embodiment of the invention, in which the most important functional components are shown.

DETAILED DESCRIPTION OF THE DRAWING

Without a precise illustration of a motor vehicle, the single FIGURE diagrammatically shows a tailgate arrangement consisting of a pivotable lower tailgate K1 and a pivotable upper tailgate K2, in the closed state.

The upper tailgate K2 reaches partially over the lower tailgate K1 in an overlapping region B. A sensor system 3 and 4 detects the respectively current position of both tailgates K1 and K2. The sensor system 3 and 4 can be an absolute value measurement sensor system at the pivot points of the tailgate arrangement or an indirect sensor system which detects only counted increments in the tailgate drives. An electronic control unit 1 can actuate both tailgates K1 and K2 in terms of the electric motors via control lines to corresponding actuators, which are known per se. The control unit 1 has a functional module 2 in the form of a program module which makes it possible to carry out the following functionalities.

During closing of both tailgates K1 and K2, for example starting from the respective start positions P1 and P2 (completely open upper tailgate K2), their respective moving speeds in the case of an identical moving start are controlled in such a way that the upper tailgate K2 passes a defined anti-collision position PO in the closing direction only when the lower tailgate K1 is completely closed. During a closing operation with an identical moving start, in particular starting from a completely open upper tailgate K2 (position P2), the moving speed of the lower tailgate K1 is in principle greater than the moving speed of the upper tailgate K2. Here too, in particular, the closing time is also to be included in the expression moving speed in an equivalent manner.

During closing of both tailgates K1 and K2, for example starting from the respective start positions P1 and P2' (=only partially open upper tailgate), their respective moving speeds are likewise controlled in such a way that the upper tailgate K2 passes a defined anti-collision position P0 in the closing direction only when the lower tailgate K1 is completely closed. Here, however, the moving start of the lower tailgate K1 can optionally be earlier than the moving start of the upper tailgate K2. Therefore, in the case of an only partially open start position P2', the upper tailgate K2 can begin to close at the start of a closing operation with a delay time dt with respect to the moving start of the lower tailgate K1. Here, the moving speeds for both tailgates can also be identical in the case of a corresponding design of the delay time dt.

After a moving start of a tailgate, in principle every intermediate stop is prevented, however.

The completely closed state of the lower tailgate K1 is ensured via a lock switch 5.

During opening of both tailgates K1 and K2, the lower tailgate K1 is not moved in the opening direction until the upper tailgate K2 has passed the defined anti-collision position PO in the opening direction.

The anti-collision position P0 is defined with a predetermined safety spacing d from the overlapping region B, which safety spacing d is greater than zero.

At the start of an opening operation, the lower tailgate K1 can begin to open with a delay time with respect to the upper tailgate K2.

During opening of the tailgates by way of the functional module 2, time-shifted energizing of the locks in order to achieve a delay time can be performed, first of all the lock of the upper tailgate K2 and then the lock of the lower tailgate K1 being opened.

The control unit 1 can be an independent control unit or can be integrated into a central control unit which is also already provided in any case for the energizing of the locks.

During an opening operation, the moving speed of the upper tailgate K2 can be greater than the moving speed of the lower tailgate K1.

Every automatic movement of the tailgates is preferably suppressed if the upper tailgate K2 has been moved manually between the completely closed position and the anti-collision position P0.

A functionality which is also independent can provide that a sensor unit 6 for detecting the longitudinal tilting of the motor vehicle is connected to the functional module 2, and that at least complete opening of at least the lower tailgate K1 is suppressed by way of the functional module 2 at least in the case of longitudinal tilting toward the rear beyond a defined threshold value.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a tailgate arrangement, comprising:
   a pivotable lower tailgate and a pivotable upper tailgate, the upper tailgate reaching partially over the lower tailgate in an overlapping region,
   a sensor system for detecting the respectively current position of both tailgates;
   an electronic control unit for motorized actuation of both tailgates, the control unit being configured to executed a program such that:
   during closing of both tailgates starting from their respective start positions and moving simultaneously during at least a portion of the closing, their respective moving speed and/or their respective moving start are controlled such that the upper tailgate is prevented from passing a defined anti-collision position in the closing direction until the lower tailgate is completely closed; and/or
   during opening of both tailgates, the lower tailgate is not moved in the opening direction until the upper tailgate has passed the defined anti-collision position in the opening direction.

2. The motor vehicle according to claim 1, wherein the completely closed state of at least the lower tailgate is ensured via a lock switch.

3. The motor vehicle according to claim 2, wherein the anti-collision position is defined with a predetermined safety spacing from the overlapping region, which safety spacing is greater than zero.

4. The motor vehicle according to claim 1, wherein the anti-collision position is defined with a predetermined safety spacing from the overlapping region, which safety spacing is greater than zero.

5. The motor vehicle according to claim 1, wherein in principle both tailgates are moved after a moving start.

6. The motor vehicle according to claim 5, wherein, depending on its current position at the start of a closing operation, the upper tailgate begins to close with a delay time with respect to the moving start of the lower tailgate, or wherein the lower tailgate begins to open with a delay time with respect to the upper tailgate at the start of an opening operation.

7. The motor vehicle according to claim 1, wherein, depending on its current position at the start of a closing operation, the upper tailgate begins to close with a delay time with respect to the moving start of the lower tailgate, or wherein the lower tailgate begins to open with a delay time with respect to the upper tailgate at the start of an opening operation.

8. The motor vehicle according to claim 1, wherein, during opening of the tailgates, time-shifted energizing of the locks in order to achieve a delay time is executed by way of the control unit, first of all a lock of the upper tailgate and then a lock of the lower tailgate being opened.

9. The motor vehicle according to claim 1, wherein, during a closing operation, the moving speed of the lower tailgate is greater than the moving speed of the upper tailgate, or wherein, during an opening operation, the moving speed of the upper tailgate is greater than the moving speed of the lower tailgate.

10. The motor vehicle according to claim 1, wherein every automatic movement of the tailgates is suppressed if the upper tailgate has been moved manually between the completely closed position and the anti-collision position.

11. A method of operating a motor vehicle tailgate arrangement having a pivotable lower tailgate and a pivotable upper tailgate, wherein the upper tailgate reaches partially over the lower tailgate in an overlapping region, the method comprising the acts of:
    detecting, via a sensor system, respectively current positions of the upper and lower tailgates;
    during closing of the upper and lower tailgates starting from their respective start positions during closing of both tailgates starting from their respective start positions and moving simultaneously during at least a portion of the closing, controlling the respective moving speed and/or the respective moving start of the upper and lower tailgates such that the upper tailgate is prevented from passing a defined anti-collision position with the lower tailgate in a closing direction until the lower tailgate is completely closed.

12. The method according to claim 11, further comprising the act of:
    during opening of the upper and lower tailgates, controlling the lower tailgate so as not to be moved in the opening direction until the upper tailgate has passed the defined anti-collision position in the opening direction.

13. The method according to claim 12, wherein the lower tailgate begins to open with a delay time with respective to the upper tailgate at the start of an opening operation.

14. The method according to claim 13, wherein, during opening of the tailgate arrangement, time-shifted energizing of locks in order to achieve the delay time is executed such that first, a lock of the upper tailgate and, secondly, a lock of the lower tailgate are opened.

15. The method according to claim 12, wherein, during an opening operation, the moving speed of the upper tailgate is greater than the moving speed of the lower tailgate.

16. The method according to claim 11, wherein
    depending on the upper tailgate current position at a start of the closing operation, the upper tailgate begins to close with a delay time with respect to the moving start of the lower tailgate.

17. The method according to claim 11, wherein, during a closing operation, the moving speed of the lower tailgate is greater than the moving speed of the upper tailgate.

18. The method according to claim 11, further comprising the act of detecting manual movement of the upper tailgate between the completely closed position and the anti-collision position; and
    suppressing all automatic movements of the upper and lower tailgates upon detecting the manual movement.

19. The method according to claim 11, wherein the anti-collision position is defined with a predetermined safety spacing from the overlapping region, which safety spacing is greater than 0.

\* \* \* \* \*